Sept. 16, 1969 M. KESSLER 3,466,773

PIN ATTACHMENT FOR A PLASTIC BADGE AND METHOD OF MAKING SAME

Filed Dec. 15, 1966

INVENTOR

Milton Kessler

BY *Max L. Libman*

ATTORNEY

United States Patent Office 3,466,773
Patented Sept. 16, 1969

3,466,773
PIN ATTACHMENT FOR A PLASTIC BADGE AND METHOD OF MAKING SAME
Milton Kessler, 6690 Harrington,
Youngstown, Ohio 44512
Filed Dec. 15, 1966, Ser. No. 601,914
Int. Cl. A44c 3/00
U.S. Cl. 40—1.5   4 Claims

ABSTRACT OF THE DISCLOSURE

A plastic badge is molded with two integral upstanding parallel ridges on the back side thereof, between which is placed the shank or back portion of a safety pin, after which a hot iron, e.g., a soldering iron, is passed across the tops of the two ridges to melt them down so that they merge with each other and cover the top of the shank of the pin, thus fastening the pin to the badge so that the assembled unit can be worn by pinning it to the wearer's clothing.

Background of the invention

Inexpensive plastic badges are made by stamping a badge of suitable shape, often with suitable lettering or design on the display face of the badge, and provided with a metal pin fixed to the back of the badge for attachment to the wearer's clothing. This pin is customarily molded into the badge or else subsequently fixed to the badge as by cementing, riveting, etc. Since these are often cheap throw-away items, it is desirable to reduce the cost as much as possible. The present invention is concerned with a novel and very inexpensive method of quickly fastening a pin to such a molded badge.

Description of the drawing

The specific nature of the invention as well as other objects and advantages thereof will clearly appear from a description of a preferred embodiment as shown in the accompanying drawing, in which:

Referring to FIG. 1, the badge 2 is shown as circular, but of course may be of any desired shape, and is in the form of a flat stamping or plastic molding, which may have any suitable lettering, design, picture, and so forth visible on its front face 3 as shown in FIG. 2. The plastic piece is molded with two integral upstanding ridges 4 and 6, all formed at the time the badge is molded into the desired shape or configuration. Ridges 4 and 6 are made sufficiently high and spaced apart sufficiently to receive the shank or back 7 of a pin 8, which is preferably made in the form of a safety pin, although it may be of any other suitable or known pin configuration.

Figure 1:
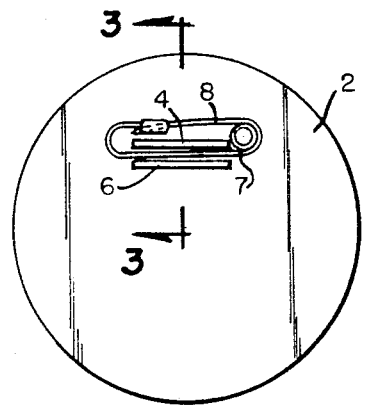
FIG. 1 is a back view of a badge according to the invention, with the pin in place, but not fixed to the badge.
Figure 2:
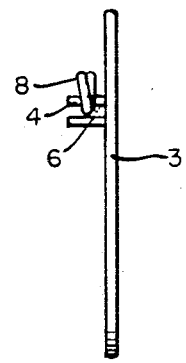
FIG. 2 is a side view of the badge shown in FIG. 1.
Figure 4:
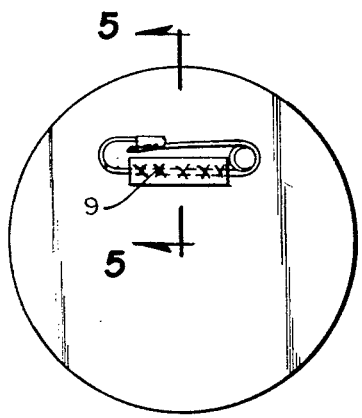
FIG. 4 is a back view similar to FIG. 1, of the completely assembled badge, with the pin fixed in place.
Figure 3:
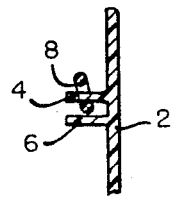
FIG. 3 is a sectional view taken on line 3—3 of FIG. 1.
Figure 5:
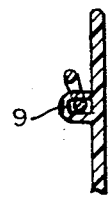
FIG. 5 is a sectional view taken on line 5—5 of FIG. 4.

After the pin has been laid in place as shown in FIG. 1, a hot iron such as a soldering iron, heated to suitable temperature to melt the plastic, which is a thermopastic material, is passed over the tops of the ridges 4 and 6 so that they are melted down toward each other and over the shank 7 of the pin to form a melted glob of plastic 9, as shown in FIGS. 4 and 5, which securely hold the pin in place. This is preferably done with the pin laid flat against the back of the badge, and the badges are preferably shipped in this condition, as they must occupy the smallest amount of space. The user can readily rotate the pin so that it is at right angles to the badge, since the plasic which retains the pin does not have sufficient holding power to appreciably resist such rotation.

It will be readily apparent that this process of assembly can be performed very rapidly, even by unskilled workers, and it is only necessary to lay the pin into the recess formed by the two upstanding ridges, and usually a single pass of a properly heated iron will suffice to seal the pin to the back of the badge.

It will be apparent that the embodiments shown are only exemplary and that various modifications can be made in construction and arrangement within the scope of my invention as defined in the appended claims.

I claim:

1. An assembly consisting of a plastic badge and a metal pin fastened to the back of the badge, said pin including a U-shaped element with a smooth, round, straight shank comprising one leg of the U, the other leg of the U being sharpened to form the pin; with the shank of the pin embedded in a mass of melted plastic which is part of the badge and which protrudes beyond the plane of the back of the badge; said pin being rotatable about the axis of said shank from a position in which the pointed leg is flat against the back of the badge to a position in which the pointed leg is spaced from the back of the badge.

2. The invention according to claim 1, in which said pin is a safety pin.

3. Method of making a badge-and-pin assembly comprising
   (a) molding a unitary badge of thermoplastic material with two closely spaced, upstanding ridges on the back thereof,
   (b) placing a U-shaped pin having one leg of the U formed as a straight shank and the other leg pointed, with the straight shank lying between said two ridges;
   (c) applying heat and some pressure to the tops of said two ridges to melt them together over the straight shank to thereby fasten the pin to the badge.

4. The invention according to claim 3, said U-shaped pin being laid flat against the back of the badge so that the pointed leg is close to said back.

References Cited

UNITED STATES PATENTS

| | | | |
|---|---|---|---|
| 2,153,157 | 4/1939 | Priesmeyer | 40—1.5 |
| 3,257,747 | 6/1966 | Schimmel | 40—1.5 |
| 3,256,626 | 6/1966 | Stoffel | 40—1.5 |

EUGENE R. CAPOZIO, Primary Examiner

WENCESLAO J. CONTRERAS, Assistant Examiner